(12) United States Patent
Coburn, II et al.

(10) Patent No.: US 6,892,216 B2
(45) Date of Patent: May 10, 2005

(54) COMMON PLATFORM FOR USE IN AUTOMOTIVE SERVICES

(75) Inventors: David Russell Coburn, II, McKinney, TX (US); George Michael Gill, Vilonia, AR (US); Matthew Todd Foreman, Greenbriar, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 797 days.

(21) Appl. No.: 09/781,236

(22) Filed: Feb. 13, 2001

(65) Prior Publication Data

US 2002/0112042 A1 Aug. 15, 2002

(51) Int. Cl.[7] .................................................. G06F 15/16
(52) U.S. Cl. .................... 709/200; 340/425.5; 340/438; 701/33; 710/10; 713/2; 713/176; 717/176; 717/178
(58) Field of Search ............................ 701/33; 710/10; 713/2, 176; 717/176, 178; 709/200, 223; 340/425.5, 438

(56) References Cited

U.S. PATENT DOCUMENTS

| | | | |
|---|---|---|---|
| 4,594,789 A | 6/1986 | Marino et al. | |
| 4,931,964 A | 6/1990 | Titsworth et al. | |
| 5,208,646 A | 5/1993 | Rogers et al. | |
| 5,361,305 A | 11/1994 | Easley et al. | |
| 5,467,286 A | 11/1995 | Pyle et al. | |
| 5,513,439 A | 5/1996 | Brauer et al. | |
| 5,535,522 A | 7/1996 | Jackson | |
| 5,541,840 A | 7/1996 | Gurne et al. | |
| 5,590,040 A | 12/1996 | Abe et al. | |
| 5,600,435 A | 2/1997 | Bartko et al. | |
| 5,724,743 A | 3/1998 | Jackson | |
| 5,734,569 A | 3/1998 | Rogers et al. | |
| 5,742,512 A | 4/1998 | Edge et al. | |
| 5,758,300 A | 5/1998 | Abe | |

(Continued)

FOREIGN PATENT DOCUMENTS

| | | |
|---|---|---|
| EP | 0 388 107 A3 | 9/1990 |
| EP | 0450829 | 10/1991 |
| EP | 0866316 | 9/1998 |
| EP | 0872715 | 10/1998 |
| WO | WO99/08168 | 2/1999 |
| WO | WO 00/05104 | 2/2000 |
| WO | WO00/05104 | 2/2000 |
| WO | WO01/01155 | 1/2001 |

OTHER PUBLICATIONS

Hunter Engineering Co. Form No. 900T-4A, "Hunter System C111", printed Feb., 1985.

(Continued)

*Primary Examiner*—Jack B. Harvey
*Assistant Examiner*—Hai V. Nguyen
(74) *Attorney, Agent, or Firm*—McDermott Will & Emery LLP

(57) ABSTRACT

A common platform is used in conjunction with a host computer to control various equipment sensors that perform different functions. In one aspect, the common platform is a micro-controller board, the host computer is a personal computer (PC), and the equipment sensors comprise an add-on card and a sensor for use in automotive services. A universal serial bus (USB) or an RS232 interface used for the common platform communicates with the host computer and with the equipment sensors. The common platform is a plug and play board that, once attached to the host computer, operates with little or no human intervention. The common platform is capable of accommodating various equipment sensors that are run by various appropriate application software. Further, the common platform can run under different operation power sources. In one aspect, these power sources include a power source embedded in the common platform, an RS232 power source, and a power source external to the common platform, such as a battery.

53 Claims, 3 Drawing Sheets

U.S. PATENT DOCUMENTS

| | | | |
|---|---|---|---|
| 5,760,938 A | | 6/1998 | Hodge |
| 5,867,730 A | * | 2/1999 | Leyda ............................ 710/10 |
| 5,916,287 A | | 6/1999 | Arjomand et al. |
| 5,960,204 A | * | 9/1999 | Yinger et al. ................ 717/176 |
| 5,969,750 A | | 10/1999 | Hsieh et al. |
| 5,978,077 A | | 11/1999 | Koerner et al. |
| 5,991,546 A | | 11/1999 | Chan et al. |
| 5,995,884 A | | 11/1999 | Allen et al. |
| 6,005,613 A | | 12/1999 | Endsley et al. |
| 6,009,363 A | | 12/1999 | Beckert et al. |
| 6,115,654 A | | 9/2000 | Eid et al. |
| 6,181,994 B1 | * | 1/2001 | Colson et al. ................. 701/33 |
| 6,362,730 B2 | * | 3/2002 | Razavi et al. ................ 340/438 |
| 6,370,455 B1 | * | 4/2002 | Larson et al. ................. 701/33 |
| 6,429,773 B1 | * | 8/2002 | Schuyler .................. 340/425.5 |
| 6,463,535 B1 | * | 10/2002 | Drews ......................... 713/176 |
| 6,513,159 B1 | * | 1/2003 | Dodson ....................... 717/178 |
| 6,526,340 B1 | | 2/2003 | Reul et al. |
| 6,556,904 B1 | * | 4/2003 | Larson et al. ................. 701/33 |
| 6,578,142 B1 | * | 6/2003 | Anderson et al. ............. 713/2 |
| 6,636,790 B1 | * | 10/2003 | Lightner et al. .............. 701/33 |

OTHER PUBLICATIONS

Hunter Engineering Co. Form No. 1824T, "Preliminary Hunter System C111 Service Manual", printed Sep., 1984.

Hunter Engineering Co. Form No. 3576T, "Series 211 Computerized Wheel Alignment Systems", printed Dec., 1993.

"IEEE Standard for a High Performance Serial Bus", Introduction p. 1, pps. 1–2, 19–20.

"Universal Serial Bus Specification" Revision 1.0 Jan. 15, 1996 pp: 1–250.

U.S. Appl. No. 09/120,594, filed Jul. 22, 1998, Rogers et al.

Hunter Engineering Co. Form No. 2015T, "Preliminary Hunter System D111 Instrumentation Cabinet Service Manual", printed Oct., 1986.

HunterTotal 4–Wheel Alignment Form 2052T "Now, System D111 . . . like an alignment instructor in your shop", printed Oct., 1986.

Hunter Engineering Co. Form No. 900T–4B, "System D/F/G111 Computerized Wheel Alignment Systems", printed Jan., 1991.

Universal Serial Bus Specification, Revision 1.1, Sep. 23, 1998, available online from http://www.usb.org/developers/docs.html.

Publication: "A Technical Introduction to USB 2.0" available online from http://www.usb.org/developers/usb20/index.html.

Website presentation and background information: USB.org–Developers–2.0, available online at http://www.usb.org./developers/usb20/backgrounder.html.

IEEE Xplore "Advanced low power system design techniques usi universal serial bus microcontroller" Hathaway, T. et al. pp:1 of 1, 270–274.

* cited by examiner

COMMON PLATFORM FOR USE IN AUTOMOTIVE SERVICES

FIELD OF THE INVENTION

The present invention relates generally to automotive services and, more specifically, to providing a common platform for usetin such services.

BACKGROUND OF THE INVENTION

Automotive Service Equipment (ASE) includes various machines, each of which performs a particular task, such as wheel alignment and balancing, emissions control, and diagnostics. Each service equipment uses different equipment sensors to gather vehicle information. Currently, for different types of services, most ASE systems use personal computers that run application-specific software to interface with application-specific equipment sensors on different service equipment. In order to accommodate different types of tasks, under a traditional approach, the personal computers have to be configured and programmed separately for each type of equipment used in different types of services. In addition, different types of interface boards are required to interface between the personal computer and different types of equipment.

This traditional approach produces several problems. First, the traditional approach reduces productivity. Technicians using the ASE systems have to locate and install or replace different types of interface board for each service. Their productivity is reduced due to the time spent on removal of old interface boards and installation of new interface boards. Second, the traditional approach increases inventories. In order to perform each type of service properly, garages have to prepare and stock up different interface boards for each type of service. This is very inefficient for business operation. Third, the traditional approach is difficult to upgrade. Under the traditional approach, if ASE systems need to perform a new function properly, both new application-specific software and new interface boards are required. While updating or upgrading software can be easily done by downloading files from remote computers through internet, the old interface boards need to be physically replaced by new interface boards. Unless the new interface boards are available, the ASE system can not perform the new function. In some cases, the old interface boards can be upgraded simply by reprogramming the logic arrays without replacing the board. However, garage technicians may still lack the skill to do the programming and therefore upgrades are not available.

SUMMARY OF THE INVENTION

Consequently, there is a need for interfacing a host computer with different kinds of service equipment while improving productivity, reducing inventories, and facilitating upgrades. The present invention addresses this and other needs by providing a common platform that can be used in conjunction with a host computer to control various equipment sensors that provide different automotive services. The common platform is configured to automatically download the appropriate software from the host computer to interface the particular service equipment to which the platform is coupled.

In one aspect, the common platform is a micro-controller board, the host computer is a personal computer (PC), and the equipment sensors comprise sensors for use in automotive services. In addition, if certain circuitry is needed to perform a specific service, an add-on card can be added to the common platform to achieve the function. A universal serial bus (USB) or an RS232 interface is used for the common platform to communicate with the host computer and with the equipment sensors. The common platform is a plug and play board that, once attached to the host computer, operates with little or no human intervention. Under techniques disclosed herein, the common platform is capable of accommodating various equipment sensors that are run by various appropriate application software. Further, the common platform can run under different operation power sources. In one aspect, these power sources include a power source embedded in the common platform, an RS232 power source, and a power source external to the common platform, such as a battery.

For example, upon initialization, the common platform notifies the host computer of the common platform's presence and identifies itself to the host computer. The common platform runs extension software that is currently loaded in the common platform. Alternatively, if there is no extension software in the common platform, the common platform causes the extension software to be loaded to the common platform. This extension software provides information about the current hardware and software of the common platform. For example, the extension software returns, to the host computer, the identifiers of the application software that is currently loaded in the common platform and any equipment sensors that are currently connected to the common platform. The host computer, having the information provided by the common platform, determines whether the application software currently loaded to the common platform and the equipment sensors are all updated. If any of the software or equipment sensors mismatch, the host computer downloads the correct application software that matches the equipment sensor, from, for example, a remote computer or a CD-ROM or a floppy disk. After initialization, the common platform, together with the connected equipment sensor, is ready to perform its intended function.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED ASPECT

Techniques are disclosed for providing a common platform that can be used in conjunction with a host computer to control various equipment sensors. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
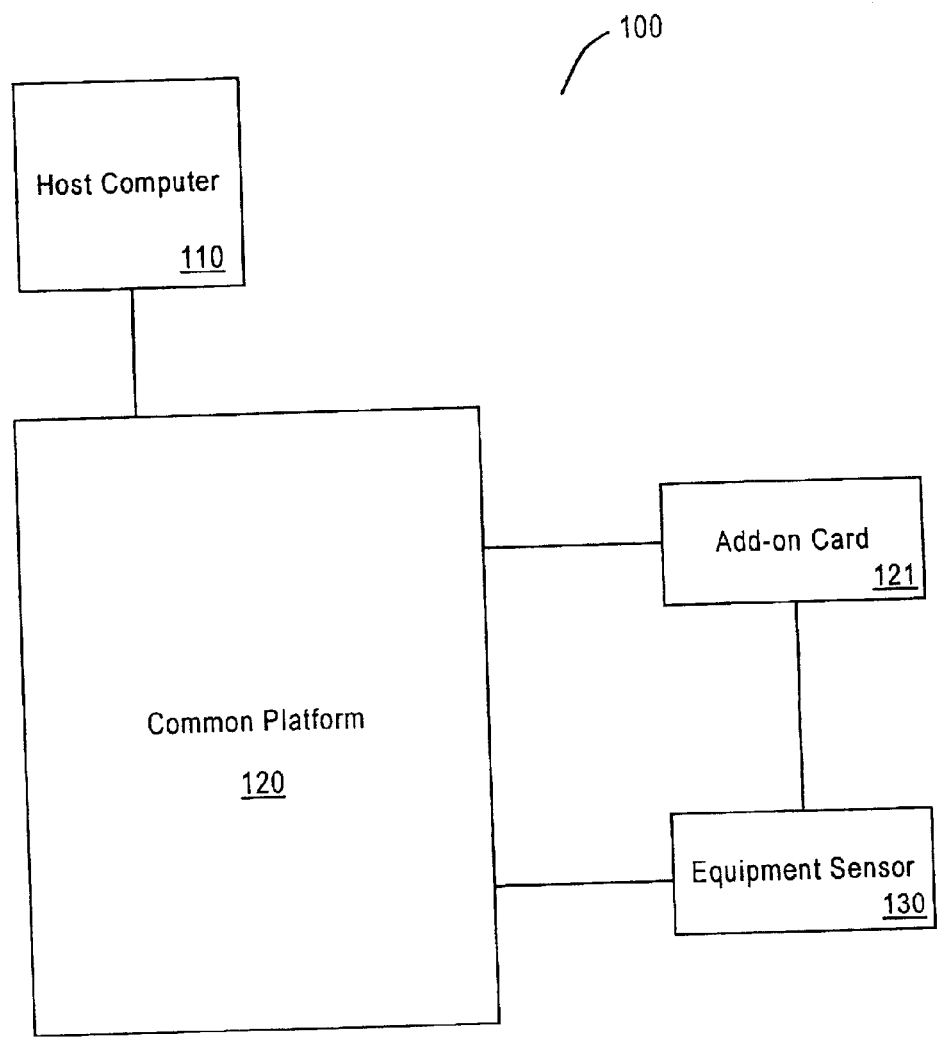
FIG. 1 shows a system upon which an aspect of the invention may be implemented.

FIG. 1 shows a block diagram of a system 100 upon which an aspect of the invention may be implemented. System 100 includes a host computer 110, a common platform 120, and one or more equipment sensors 130.

Host computer 110 can be any computer used to communicate with common platform 120 and equipment sensors 130. In one aspect, host computer 110 is a personal computer that runs Operating Systems (OS), such as Windows 95, Windows 98 or Windows NT. The host computer 110 also includes various software for facilitating the functions of equipment sensors 130. For example, host computer 110 contains software to analyze information provided by equipment sensors 130, to display that information on a screen of host computer 110 for an operator to perform a particular function related to an equipment sensor 130, etc. Consequently, if equipment sensors 130 are to perform wheel alignment on cars, then host computer 110 runs software related to wheel alignments.

In one aspect, a host computer 110 provides a set of drivers to work in conjunction with software in common platform 120. For example, when a host computer 110 powers up, a process of enumeration begins for common platform 120 to identify itself as a generic interface platform to host computer 110. Host computer 110 loads and runs a driver that monitors host computer 110's external communication ports. If common platform 120 is connected to host computer 110 via one of these communication ports, then common platform 120 provides to the host computer 110 information about the common platform 120. The driver uses this information to load a second Windows driver that is able to fully communicate with the current configuration of common platform 120. This second driver then obtains the configuration status of Common platform 120, and, when appropriate, loads extension software to common platform 120. After common platform 120 executes the extension software, common platform 120 enumerates again as a specific interface device. Host computer 110 then loads a third driver, which performs the software interface between common platform 120 and any software that is running in host computer 120 to communicate with equipment sensors 130.

Sometimes, certain tasks require additional circuitry other than those provided by common platform 120. The present invention also provides a solution. In one aspect, common platform 120 includes an add-on card 121. The add-on card 121 provides additional circuitry adequate to handle a particular task. In these conditions, appropriate circuitry is adapted to connect add-on card 121 to common platform 120, and add-on card 121 communicates directly with equipment sensors 130.

In one embodiment, equipment sensors 130 may be, for example, an automotive diagnostic device, a gravity sensor, an alignment sensor, a device or a camera to measure the toe of the wheels in an automobile, a camera that reports images to host computer 110, or any device commonly used in automotive services. Through common platform 120, the information collected by equipment sensors 130 is transmitted to host computer 110 to be analyzed. Equipment sensors 130 may communicate with common platform 120 directly or through an add-on card 121 by various interface means, including, for example, USB, RS232, the Ethernet, etc.

Common Platform

Common platform 120 provides a plug and play electronic hardware interface between host computer 110 and equipment sensors 130. In one aspect, common platform 120 is a single piece of hardware, but, through various components that will be described herein, common platform 120 is configurable. That is, common platform 120 can be loaded with different software routines to control different equipment sensors 130. In one aspect, these software routines are downloadable from host computer 110.

In one aspect, common platform 120 is designed in a way that common platform 120 can be connected to or disconnected from host computer 110 without having to open the case of host computer 110.

Figure 2:
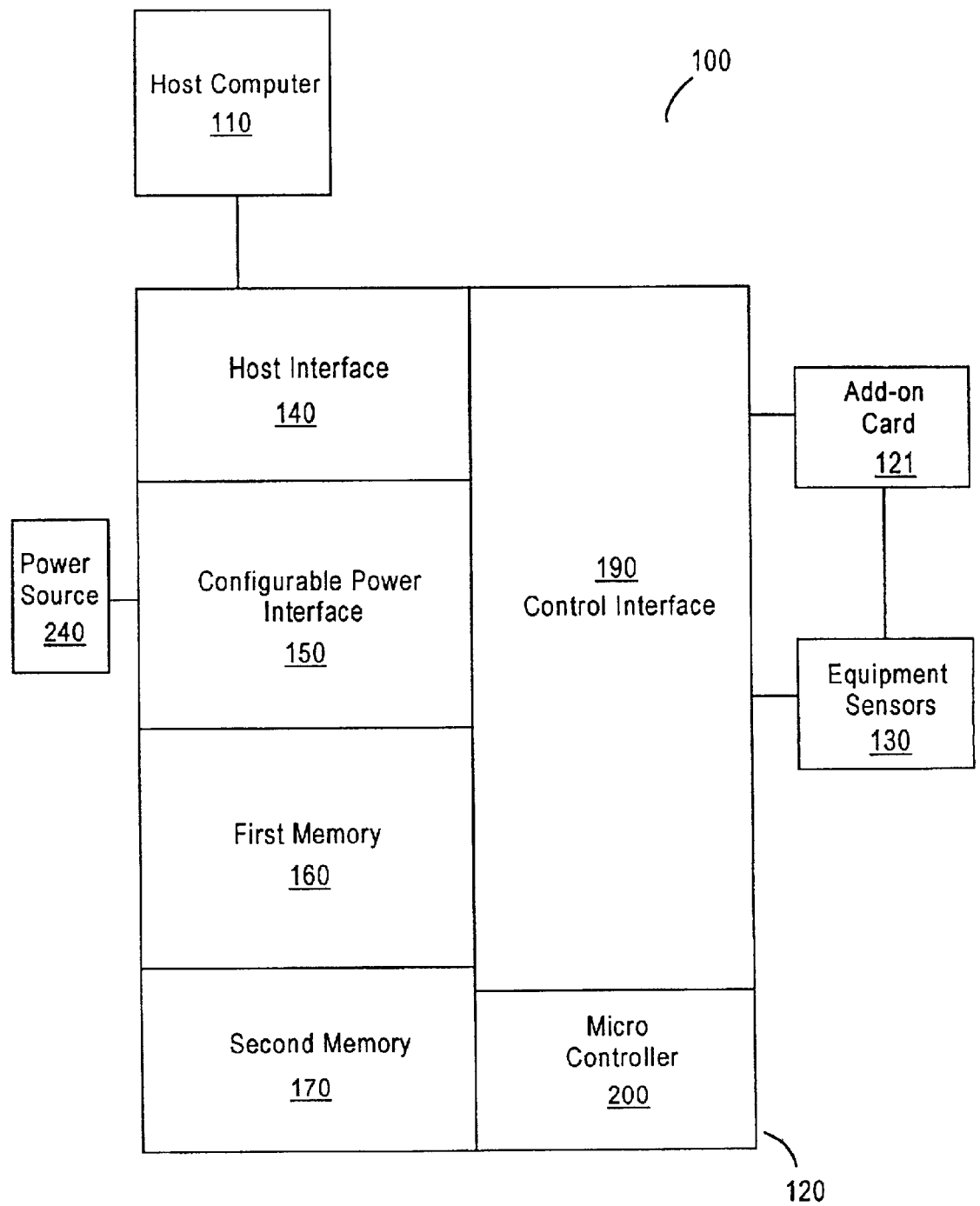
FIG. 2 shows a block diagram of the common platform, in accordance with one aspect.

FIG. 2 shows a block diagram of a common platform 120, in accordance with one aspect. The common platform 120 comprises a host interface 140, configurable power interface 150, a memory including a first memory 160 and a second memory 170, a control interface 190, an external power source 240, and a micro-controller 200.

Host interface 140 enables host computer 110 to communicate with common platform 120 via various communications protocols such as USB, RS232, or firewires. Those skilled in the art will recognize that USB is a communications architecture that gives a PC the ability to interconnect a variety of devices via a simple four-wire cable. RS232 is a standard interface approved by the Electronic Industries Association for connecting serial devices. Further, an RS232 port includes configurable baud rates.

Configurable power interface 150 provides the ability for common platform 120 to select a power source from a plurality of power sources, such as an external power source 240, a power source from host computer 120, or USB power.

First memory 160 stores bootloader software for common platform 120. In one aspect, first memory 160 is an electrically erasable programmable read-only memory (EEPROM).

Second memory 170 stores extension software and application software. In one aspect, second memory 170 is flash memory.

Control interface 190 enables communications between common platform 120 and equipment sensors 130. These communications may be performed via the Ethernet, RS232, USB, or any other communication means. In one aspect, control interface 190 includes a dedicated interface and a configurable interface. Therefore, additional add-on cards 121 can be connected to and communicate with the common platform 120. Based upon the application software that is loaded in second memory 170, appropriate circuitry in control interface 190 is selected to control these communications.

Micro-controller 200 runs the software in memories 160 and 170. Micro-controller 200 is any conventional micro-controller or processor, such as 8051 or AN2131 QC from AnchorChips, that can be utilized to perform the functions described herein.

In one aspect, common platform 120 is configured to select an operation power source from different power sources, including a power source embedded in common platform 120, an external power source 240, such as a battery, or a power source provided by host computer 110. Further, common platform 120 can be configured as either a self-powered or an USB-powered function. In one aspect, common platform 120 is configured as self-powered when 1) the RS232 logic levels are required from common platform 120, 2) equipment sensors 130 require more than 200MA, or 3) equipment sensors 130 require 5-Volts circuitry.

Software for the Common Platform

In a preferred embodiment, common platform 120 includes three distinct sets of software: bootloader software, extension software, and application software.

1) Bootloader Software

Bootloader software is stored in first memory 160. Bootloader software, in one aspect, is a small embedded software file, which, when powered up, loads a second software file to be used by common platform 120.

Bootloader software is provided for implementing the self-configuration abilities of common platform 120. At power up reset, bootloader software identifies common platform 120 to host computer 110. Bootloader software notifies host computer 110 of the presence of common platform 120, and, if necessary, reprograms control interface 190, downloads and starts execution of the most current extension software that is stored in second memory 170.

2) Extension Software

Extension software is stored in second memory 170. Second memory 170 is a device that can hold data for storage. In this embodiment, second memory 170 is a flash memory.

Extension software determines what type of equipment sensor 130 is attached to common platform 120 so that appropriate application software for equipment sensors 130 may be loaded to second memory 170. In one aspect, the equipment sensors 130 are set to provide self-identification information. Thus, the common platform 120 is able to identify to which service equipment it is coupled and, in one aspect, reports to the host computer 110.

Extension software also determines what version of application software is currently loaded in second memory 170 of common platform 120. The use of Extension software keeps the common platform to operate under the most updated conditions. Extension software requires update frequently so that it contains information about the newest equipment sensors that might be connected to common platform 120. Therefore, the Extension software can identify the newest equipment sensors and download appropriate application software to control operation of the equipment sensors 130.

Keeping the application software up-to-date is very important. For example, in one aspect, an electrically programmable logic device (EPLD) is used in control interface 190. EPLD provides programmable logic arrays. The application software programs the EPLD to provide a correct communication interface according to the type of equipment sensor 130 to be used with the common platform 120. If the application software is not up-to-date, it is unable to provide the correct EPLD program to program the EPLD. Therefore, communication between the new equipment sensor and the common platform will fail. Then host computer 110 resets system 100 and downloads a new EPLD file.

To achieve the above-stated function, extension software includes routines such as "get_configuration_status," "download_application_code," and "execute_application_code."

The "get_configuration_status" routine gathers and transmits information including the currently loaded application software that is stored in second memory 170, equipment sensors 130 that are connected to common platform 120, and control interface 190 of common platform 120.

The "download_application_code" routine downloads certain application software from host computer 110 in response to a "download_application_code" command issued by the host computer 110.

The "execute_application_code" routine executes the application software stored in the second memory 170 in response to a "execute_application_code" command issued by the host computer 110.

In response to a "get_configuration_status" command received from host computer 110, the "get_configuration_status" routine causes common platform 120 to return information including the currently loaded application software that is stored in second memory 170, equipment sensors 130 that are connected to common platform 120, and common platform control interface 190. In one aspect, the equipment sensors 130 are arranged to provide self-identification information. The self-identification information can be obtained by several ways. For example, the equipment sensor can send out identification code to the common platform or to the host computer. Alternatively, the equipment sensor can use special configured connectors connecting to the common platform so that each pin arrangement of the connector represents certain type of equipment sensor. Still another example is that the technician may just key in the equipment sensor type directly.

Host computer 110 uses this information to determine if all software and hardware components that relate to common platform 120 are up-to-date. In case the software is not up-to-date, common platform executes the "download_application_code" routine to download the appropriate software from the host computer 110 to match the hardware.

In one aspect, common platform 120, instead of the host computer 110, is responsible to determine whether application software is current and matches equipment sensors 130 that are connected to common platform 120. Common platform 120 then reports the result to the host computer 110.

The "download_application_code" downloads the correct application software to second memory 170 as needed. For example, if the application software does not exist in second memory 170, or is obsolete, or is corrupted, then the "download_application_code" routine downloads the appropriate application software to second memory 170.

The "execute_application_code" starts the desired application software stored in second memory 170. This command is normally issued by the host computer 110 when it is satisfactory that a particular configuration of common platform 120 is adequate to perform a particular task. In the automotive application, the task relates to automotive services.

In another aspect, host computer 110 does not compare if the application software matches the type of equipment sensor 130. In this embodiment, after receiving signals indicating the type of the equipment sensor 130, the host computer 110 always loads corresponding application software into the common platform.

3) Application Software

Application software controls and communicates with equipment sensors 130. In accordance with techniques of the invention, each version of application software matches a corresponding version of equipment sensors 130. Accordingly, if a version of application software does not match the corresponding version of equipment sensors 130, then appropriate software will be loaded. In one aspect, host computer 110 loads the correct application software during initialization of common platform 120.

In one embodiment, application software is stored in second memory 170. Application Software enables common platform 120 with appropriate equipment sensors 130 to accomplish a particular task. Application software also interfaces with the software of host computer 110 to facilitate that task. Exemplary tasks of equipment sensors 130 include automotive service tasks such as wheel alignment, balancing, emissions control, and diagnostics.

Interatction Between the Host Computer and the Common Platform

Figure 3:
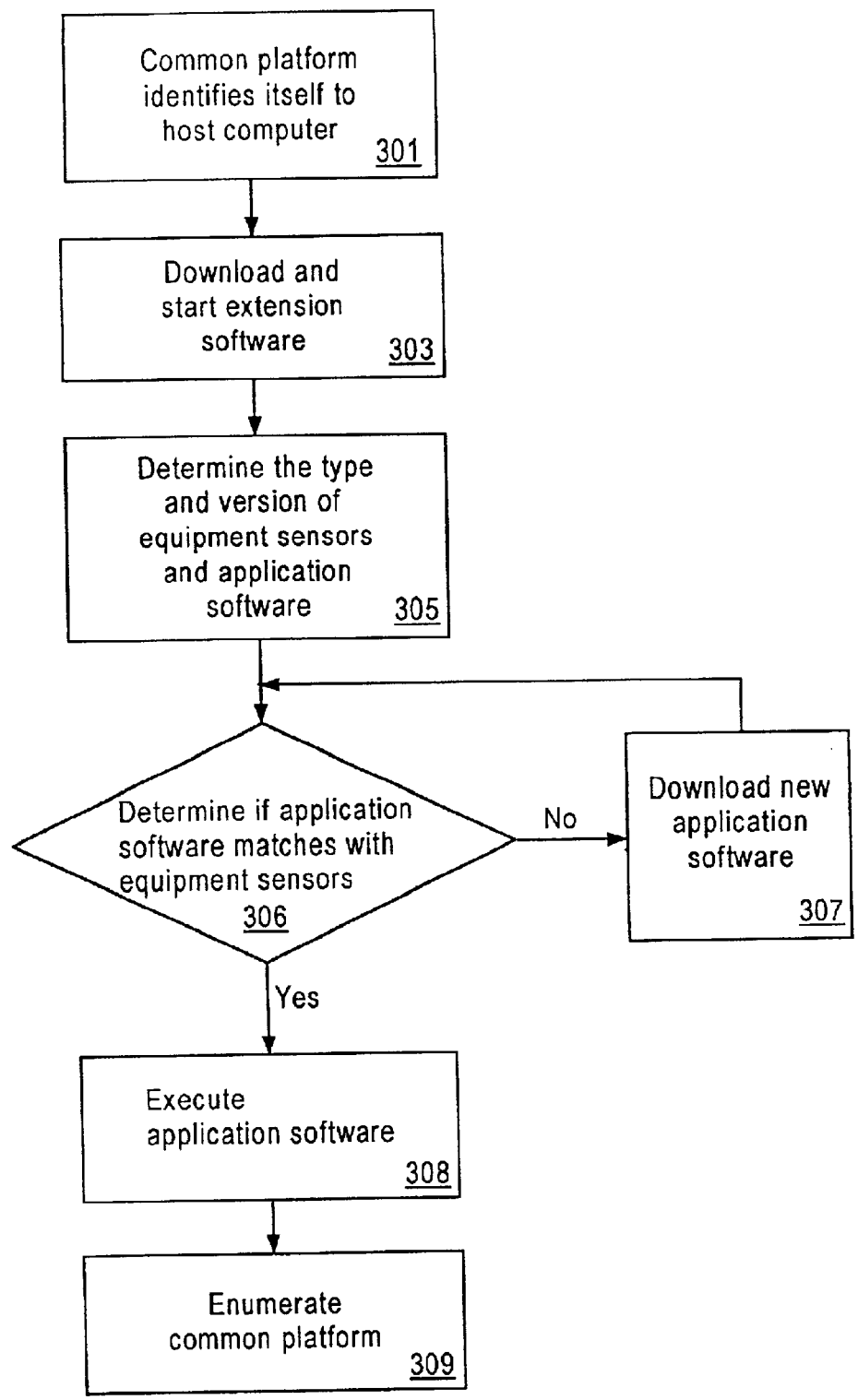
FIG. 3 is a flowchart illustrating an interaction between the host computer and the common platform.

FIG. 3 is a flowchart illustrating an interaction between host computer 110 and common platform 120. In step 301, common platform 120 identifies itself to host computer. The enumeration allows initial communications between host computer 110 and common platform 120.

In step 303, the extension software is downloaded to common platform 120 and execution of this extension software begins. In one aspect, steps 301 and 303 are performed by instructions embedded in bootloader software. Further, after the extension software is downloaded, bootloader software passes control to the extension software.

In step 305, host computer 110 issues a "get_configuration_status" command to cause common platform 120 to return identifiers of currently loaded application software, any connected equipment sensor 130, and connected add-on cards 121.

In step 306, host computer 120 determines whether application software is current and matches equipment sensors 130 that are connected to common platform 120.

If the application software is current and matches the equipment sensors 130 connected to common platform 120, then host computer 110 in step 308 issues the "execute_application_code" command and executes the application software.

However, if there are any problems with the application software, such as obsolete or incorrect code or the code does not match the versions of equipment sensors 130, then host computer 110 in step 307 issues a "download_application_code" command and correct application software is downloaded for equipment sensors 130.

In one aspect, common platform 120, instead of the host computer 110, determines whether application software is current and matches equipment sensors 130 that are connected to common platform 120. Common platform 120 then reports the result to the host computer 110. If the application software is current and matches the equipment sensors 130 connected to common platform 120, then host computer 110 in step 308 issues the "execute_application_code" command and executes the application software.

However, if there are any problems with the application software, such as obsolete or incorrect code or versions, then host computer 110 in step 307 issues a "download_application_code" command and correct application software is downloaded for equipment sensors 130.

In another aspect, all application software starts by enumerating the system, as shown in step 309. In the aspect that an USB is used with a PC, enumerating the system causes host computer 110 to execute the "get_device_description" command and the "get_device_configuration" command. These commands provide the vendor and product identifications that are required by host computer 110 to load the correct driver for application software. In accordance with the inventive technique, this process to load the correct driver is all automatic and transparent to the user using system 100.

Benefits of the Inventive Techniques

Common platform 120 is a plug and play system, i.e., it requires little or no human assistance in its setup procedure. Common platform 120 is capable of running under different power configurations. Common platform 120 maintains compatibility with equipment sensors 130, and allows these equipment sensors 130 to include additional functions. Common platform 120 can accommodate new equipment sensors with new downloadable software from host computer 110. Software and hardware of common platform 120 are reusable, which enables reduced product time to market.

In the foregoing specification, the invention has been described with reference to specific aspects thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A common platform for use with a host computer capable of controlling more than one type of equipment sensors, said common platform comprising:
   a host interface for communicating with said host computer;
   a control interface for communicating with an equipment sensor;
   a memory for storing bootloader software; and
   a processor coupled to said memory, said host interface and said control interface;
   said processor executing said bootloader software for performing the steps of:
      automatically downloading extension software into said memory;
      executing the downloaded extension software;
      under the control of the downloaded extension software, determining the type of said equipment sensor;
      responsive to a result of the determining step, downloading application software corresponding to the type of equipment sensor into said memory, wherein the application software is used for configuring the common platform for use with the equipment sensor; and
      executing said application software.

2. The common platform of claim 1, wherein said application software produces steps to configure said common platform to perform a predetermined function.

3. The common platform of claim 1, wherein said equipment sensor is removably attached to said common platform.

4. The common platform of claim 1, wherein said host interface complies with a standard selected from a set of standards comprising Universal Serial Bus standard and RS232 standard.

5. The common platform of claim 1, further comprising:
   configurable power interface for selecting one of a plurality of power sources for providing power to the common platform; and
   a power control module for providing the selected one of the plurality of power sources to said common platform, wherein the selected one of the plurality of power sources is selected from a set of power sources consisting of a power source embedded in said common platform, a power source provided from said host computer, and a power source external to said common platform and external to said host computer.

6. The common platform of claim 5, wherein said equipment sensor is selected from a group of equipment sensors consisting of an alignment sensor, a gravity sensor, and an image-capturing device for capturing images of objects.

7. The common platform of claim 1, wherein said processor sends information to said host computer indicating at least one of the following:

the type of said equipment sensor;

the version of said equipment sensor; and the version of said application software that has been loaded to said memory.

8. The common platform of claim 1, wherein said application software interfaces with said host computer to cause said host computer to run drivers corresponding to the function which said common platform is being performed.

9. The common platform of claim 8, wherein said bootloader software is stored in a first memory and said application software is stored in a second memory.

10. The common platform of claim 9, wherein said first memory is a non-volatile memory.

11. The common platform of claim 1, wherein the common platform transfers information collected by the equipment sensor to the host computer and the processor downloads the application software corresponding to the equipment sensor from the host computer.

12. The common platform of claim 1, wherein the control interface includes a programmable circuit.

13. The common platform of claim 1, wherein the processor programs the control interface based on the downloaded application software.

14. A common platform for use with a host computer capable of controlling more than one type of equipment sensors, said common platform comprising:

a host interface for communicating with said host computer;

a control interface for communicating with an equipment sensor;

a memory for storing bootloader software and application software; and a processor coupled to said memory, said host interface and said control interface;

said processor configured for executing said bootloader software to perform the steps of:

automatically downloading extension software into said memory;

executing the downloaded extension software;

under the control of the downloaded extension software, determining the type of said equipment sensor;

under the control of the downloaded extension software, determining whether said application software stored in said memory matches the type of said equipment sensor;

if said application software matches said equipment sensor, then executing said application software;

if the application software does not match said equipment sensor, then downloading new application software corresponding to said equipment sensor into said memory, wherein the application software is used for configuring the common platform for use with the equipment sensor.

15. The common platform of claim 14, wherein the common platform transfers information collected by the equipment sensor to the host computer and the processor downloads the new application software corresponding to the equipment sensor from the host computer.

16. The common platform of claim 14, wherein the control interface includes a programmable circuit.

17. The common platform of claim 16, wherein the processor programs the control interface based on the downloaded application software.

18. A method for preparing a common platform for use with a host computer capable of controlling more than one type of equipment sensors connected to said common platform, the method comprising the steps of:

reading bootloader software stored in said common platform;

executing the bootloader software;

under the control of the bootloader software, automatically downloading extension software into said common platform;

executing the downloaded extension software;

under the control of the downloaded extension software, determining the type of equipment sensor connected to said common platform;

responsive to a result of the determining step, downloading application software corresponding to the type of said equipment sensor to said common platform; and configuring said common platform to perform a predetermined function based on the downloaded application software.

19. The method of claim 18, further comprising a step of sending a signal to said host computer indicating the existence of said common platform.

20. The method of claim 18, wherein said equipment sensor is selected from a group of equipment sensors consisting of an alignment sensor, a gravity sensor, and an image-capturing device for capturing images of objects.

21. The method of claim 18, wherein before the step of downloading application software, the method further comprises a step of sending information to said host computer indicating at least one of the following:

the type of said equipment sensor;

the version of said equipment sensor; and the version of said application software that has been loaded to said common platform.

22. The method of claim 18, wherein the common platform transfers information collected by the equipment sensor to the host computer and the application software corresponding to the type of the equipment sensor is downloaded from the host computer.

23. The method of claim 18, further comprising the step of communicating with the equipment sensor via a control interface.

24. The method of claim 23, wherein the processor programs the control interface based on the downloaded application software.

25. A method for preparing a common platform for use with a host computer capable of controlling more than one type of equipment sensors connected to said common platform, the method comprising the steps of:

reading bootloader software stored in said common platform;

executing the bootloader software;

under the control of the bootloader software, automatically downloading extension software into said common platform;

executing the downloaded extension software;

under the control of the downloaded extension software, determining the type of equipment sensor connected to said common platform; and determining whether application software stored in said common platform matches the type of said equipment sensor;

if said application software matches the type of said equipment sensor, then executing said application software;

if said application software does not match the type of said equipment sensor, then downloading new application software corresponding to said equipment sensor type into said common platform; and configuring said common platform to perform a predetermined function based on the application software.

26. The method of claim 25, wherein the common platform transfers information collected by the equipment sensor to the host computer and the application software corresponding to the type of the equipment sensor is downloaded from the host computer.

27. The method of claim 25 further comprising the step of communicating with the equipment sensor via a control interface.

28. The method of claim 27, wherein the processor programs the control interface based on the downloaded application software.

29. A common platform for use with a host computer capable of controlling more than one type of equipment sensors, said common platform comprising:
a host interface for communicating with said host computer;
a control interface for communicating with an equipment sensor;
a memory for storing bootloader software and application software; and
a processor coupled to said memory, said host interface and said control interface;
said processor configured for executing said bootloader software to perform the steps of:
automatically downloading extension software into said memory;
under the control of the downloaded extension software, identifying a type of said equipment sensor to said host computer;
under the control of the downloaded extension software, identifying the version of said application software stored in said memory to said host computer;
said host computer then determining whether said application software stored in said memory matches the type of said equipment sensor;
if said application software matches said equipment sensor, then causing said common platform to execute said application software; and
if said application software does not match said equipment sensor, then downloading new application software corresponding to said equipment sensor into said memory, wherein the application software is used for configuring the common platform for use with the equipment sensor.

30. The common platform of claim 29, wherein the common platform transfers information collected by the equipment sensor to the host computer and the application software corresponding to the type of the equipment sensor is downloaded from the host computer.

31. The common platform of claim 29, wherein the control interface includes a programmable circuit.

32. The common platform of claim 31, wherein the processor programs the control interface based on the downloaded application software.

33. A common platform configured to detachably couple to a host computer of an automotive service system capable of controlling more than one type of equipment sensors, said common platform comprising:
host interface means for communicating with said host computer;
control interface means for communicating with an equipment sensor, wherein the equipment sensor is configured to detachably couple to the common platform and to collect parameters related to a vehicle;
memory means for storing bootloader software; and
processor means, coupled to said memory, said host interface and said control interface, for executing said bootloader software to perform the steps of:
determining the type of said equipment sensor; and
responsive to a result of the determining step, downloading application software corresponding to the type of equipment sensor into said memory means, wherein the application software is used for configuring the common platform for use with the equipment sensor.

34. The common platform of claim 33, wherein the common platform transfers information collected by the equipment sensor to the host computer and the application software corresponding to the type of the equipment sensor is downloaded from the host computer.

35. The common platform of claim 33, wherein the control interface means includes a programmable circuit.

36. The common platform of claim 35, wherein the processor programs the programmable circuit based on the downloaded application software.

37. A common platform configured to detachably couple to a host computer of an automotive service system capable of controlling more than one type of equipment sensors, said common platform comprising:
host interface means for communicating with said host computer;
control interface means for communicating with an equipment sensor, wherein the equipment sensor is configured to detachably couple to the common platform and to collect parameters related to a vehicle;
memory means for storing bootloader software and application software; and
processor means, coupled to said memory, said host interface and said control interface, for executing said bootloader software to perform the steps of:
determining the type of said equipment sensor; and
determining whether said application software stored in said memory means matches the determined type of said equipment sensor;
if said application software matches said determined type of equipment sensor, then executing said application software; and
if the application software does not match said determined type of equipment sensor, then downloading new application software corresponding to said determined type of equipment sensor into said memory means,
wherein the application software is used for configuring the common platform for use with the equipment sensor.

38. The common platform of claim 37, wherein the common platform transfers information collected by the equipment sensor to the host computer and the application software corresponding to the type of the equipment sensor is downloaded from the host computer.

39. The common platform of claim 37, wherein the control interface means includes a programmable circuit.

40. The common platform of claim 39, wherein the processor programs the programmable circuit based on the application software.

41. A common platform for use in an automotive service system external to a vehicle, the common platform comprising:

a host interface for detachably coupling the automotive service system;
a control interface configured to detachably receive an equipment sensor;
a memory for storing first software; and
a processor coupled to the memory, the host interface and the control interface;
wherein the processor, upon execution of the first software software, performs the steps of:
  automatically downloading second software into the memory;
  executing the downloaded second software;
  under the control of the downloaded second software, determining the type of the equipment sensor; and
  responsive to a result of the determining step, downloading third software corresponding to the type of equipment sensor into the memory, wherein the third software is used for configuring the common platform for use with the equipment sensor.

42. The common platform of claim 41, wherein the common platform is configured to removably connect to the automotive service system.

43. The common platform of claim 41, wherein the equipment sensor is configured to collect parameters of the vehicle.

44. The common platform of claim 41, wherein the equipment sensor is an alignment sensor.

45. The common platform of claim 41, wherein the control interface includes a programmable circuit.

46. The common platform of claim 45, wherein the processor programs the programmable circuit based on the application software.

47. A common platform for use in an automotive service system, the common platform comprising:
  a host interface for communicating with the automotive service system;
  a control interface configured to communicate with an equipment sensor, wherein the control interface includes a programmable circuit;
  a memory for storing bootloader software; and
  a processor coupled to the memory, the host interface and the control interface;
wherein the processor, upon execution of the bootloader software, performs the steps of:
  determining the type of the equipment sensor;
  responsive to a result of the determining step, downloading application software corresponding to the type of equipment sensor into the memory; and
  programming the programmable circuit of the control interface based on the downloaded application software.

48. An automotive service system external to a vehicle, the system comprising:
  an equipment sensor for collecting parameters of the vehicle;
  a data processing system;
  a common platform configured to detachably couple to the data processing system and to detachably receiving the equipment sensor, wherein the common platform including:
  a host interface for communicating with the data processing system;
  a control interface for communicating with the equipment sensor;
  a memory for storing first software; and
  a processor coupled to the memory, the host interface and the control interface;
  wherein the processor, upon executing the first software, performs the steps of:
    automatically downloading second software into the memory;
    executing the downloaded second software;
    under the control of the downloaded second software, determining the type of the equipment sensor; and
    responsive to a result of the determining step, downloading third software corresponding to the type of equipment sensor into the memory, wherein the third software is used for configuring the common platform for use with the equipment sensor.

49. The system of claim 48, wherein the control interface includes a programmable circuit.

50. The system of claim 49, wherein the processor programs the programmable circuit based on the downloaded third software.

51. An automotive service system external to a vehicle, the system comprising:
  an equipment sensor for collecting parameters of the vehicle;
  a data processing system;
  a common platform configured to detachably couple to the data processing system and to detachably receive the equipment sensor, wherein the common platform includes:
    a host interface for communicating with the data processing system;
    a control interface for communicating with the equipment sensor, wherein the control interface includes a programmable circuit;
    a memory for storing bootloader software; and
    a processor coupled to the memory, the host interface and the control interface;
  the processor, upon executing the bootloader software, performing the steps of:
    determining the type of the equipment sensor;
    responsive to a result of the determining step, downloading application software corresponding to the type of equipment sensor into the memory; and
    programming the programmable circuit based on the downloaded application software.

52. A common platform for use with a host computer capable of controlling more than one type of equipment sensors, said common platform comprising:
  host interface means for communicating with said host computer;
  control interface means for communicating with an equipment sensor;
  memory means for storing bootloader software; and
  processor means, coupled to said memory, said host interface and said control interface, for executing said bootloader software to perform the steps of:
    automatically downloading extension software;
    executing the downloaded extension software;
    under the control of the downloaded extension software, determining the type of said equipment sensor, and
    responsive to a result of the determining step, downloading application software corresponding to the type of equipment sensor into said memory means, wherein the application software is used for configuring the common platform for use with the equipment sensor.

53. A common platform for use with a host computer capable of controlling more than one type of equipment sensors, said common platform comprising:

host interface means for communicating with said host computer;

control interface means for communicating with an equipment sensor;

memory means for storing bootloader software and application software; and processor means, coupled to said memory, said host interface and said control interface, for executing said bootloader software to perform the steps of:
automatically downloading extension software;
executing the downloaded extension software;
under the control of the downloaded extension software, determining the type of said equipment sensor; and under the control of the downloaded extension software, determining whether said application software stored in said memory means matches the type of said equipment sensor;

if said application software matches said equipment sensor, then executing said application software; and if the application software does not match said equipment sensor, then downloading new application software corresponding to said equipment sensor into said memory means, wherein the application software is used for configuring the common platform for use with the equipment sensor.

* * * * *